United States Patent
Hagen et al.

[19]

[11] Patent Number: 6,026,724

[45] Date of Patent: Feb. 22, 2000

[54] SHARPENING DEVICE

[75] Inventors: Holger Hagen, Pittsburgh; David M. Vanistendael, Bridgeville, both of Pa.

[73] Assignee: Pleiger Plastics Corporation, Washington, Pa.

[21] Appl. No.: 08/785,339

[22] Filed: Nov. 22, 1995

Related U.S. Application Data

[63] Continuation-in-part of application No. 08/163,067, Dec. 6, 1993, abandoned.

[51] Int. Cl.[7] .......................................... B26D 1/04
[52] U.S. Cl. .............................. 83/455; 83/468.4; 83/614
[58] Field of Search ........................ 83/455, 614, 468.7, 83/468.2, 468.4; 269/277, 279

[56] References Cited

U.S. PATENT DOCUMENTS

| | | | |
|---|---|---|---|
| 294,736 | 3/1884 | Hyle | 269/279 |
| 2,973,577 | 3/1961 | Schekowski | 83/455 X |
| 3,368,808 | 2/1968 | Worthington | 269/279 |
| 3,886,657 | 6/1975 | Fabian | 83/614 X |
| 3,918,337 | 11/1975 | Lindblad et al. | 83/614 X |
| 4,083,547 | 4/1978 | Gurley | 269/279 X |
| 4,334,448 | 6/1982 | Messerschmitt | 83/455 X |
| 4,604,802 | 8/1986 | Samuelsson | 30/314 X |
| 4,987,810 | 1/1991 | Stevens . | |
| 5,168,786 | 12/1992 | Huggins et al. | 83/614 X |
| 5,335,573 | 8/1994 | Rogers | 83/455 X |

*Primary Examiner*—Kenneth E. Peterson
*Attorney, Agent, or Firm*—Thomas C. Wettach

[57] ABSTRACT

The present invention relates to a sharpening device for sharpening a wear edge of a rubber, plastic or polyurethane blade, such as a synthetic squeegee blade used in silk screening printing, comprising a housing with a base and an upper surface having a longitudinal clamp for clamping the blade during the sharpening operation. The sharpening device further comprises a cutting blade or knife which is removably held by a moveable carriage, both of which are located within a housing. The carriage is mounted on a block assembly and, preferably, carries a removable cutter holder. In operation, the carriage travels along the path of the wear edge of the squence blade, and the cutting blade or knife acts to cut off the wear edge of the blade and simultaniously treat a new edge. The cutting blade is mounted in an inclined position, with respect to the horizontal length of the wear edge, so that the upper beveled surface of the cutting blade is substantially parallel to the horizontal plane of the wear edge. The upper surface of the housing is designed to position the squeegee blade and align same with the cutting blade. The sharpening device according to the present invention is able to sharpen the wear edge of the blade quickly and easily while maintaining the fineness and flatness of said edge of the blade.

18 Claims, 6 Drawing Sheets

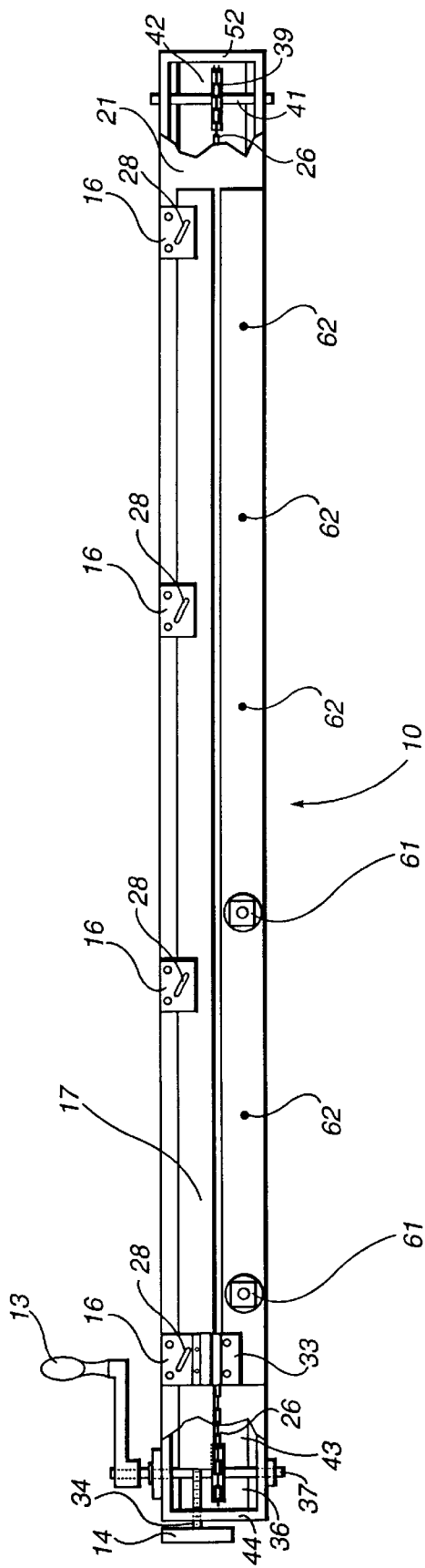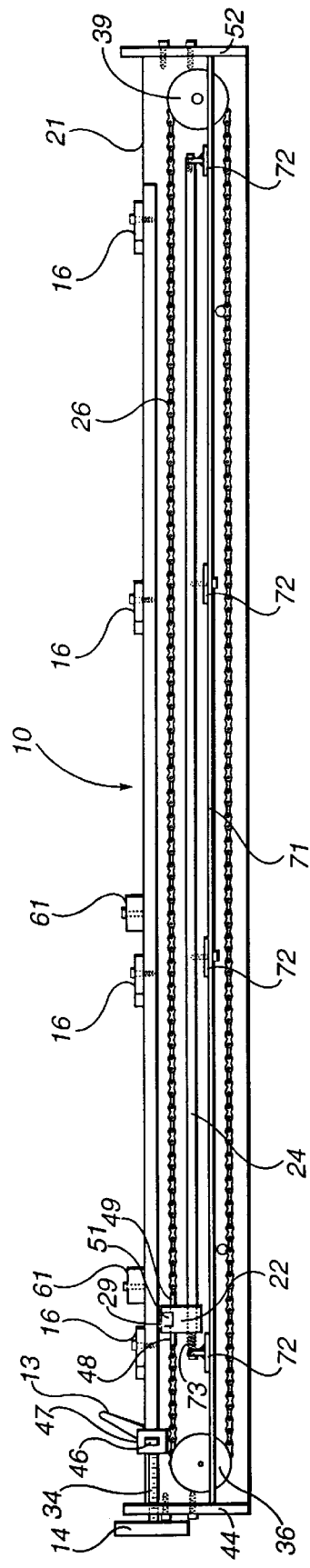

SHARPENING DEVICE

CROSS-REFERENCES TO RELATED APPLICATIONS

This is a continuation-in-application of application Ser. No. 08/163,067 filed Dec. 6, 1993, now abandoned, entitled "A Sharpening Device."

FIELD OF INVENTION

The present invention relates to a sharpening device for use in sharpening a rubber, plastic or polyurethane blade and particularly to a device for sharpening a synthetic squeegee blade for use in silk screening printing.

BACKGROUND OF THE INVENTION

In silk screening printing a synthetic squeegee blade, typically a cast polyurethane material, is used to scrape the ink from one end of the screening to the other end to accomplish printing. The wear edges of these synthetic squeegee blades wear out after a period of use due to the friction between the squeegee blade and the screen. This results in a printing area with a non-uniform ink density. Therefore, the wear edge of the squeegee blade must be replaced. This is done by replacing the squeegee blade or sharpening the blade edge after a period of operation. Additionally, the flatness of the squeegee blade is important in maintaining the quality of the printed product, so it is necessary while sharpening the wear edge of the squeegee blade to maintain its flatness. Similar concerns as to blade flatness and blade sharpening exist in other applications of rubber, plastic or polyurethane blades.

One technique used to prolong the use of a squeegee blade is to sharpen the edges by grinding material from the squeegee blade to provide a sharp edge. The conventional device is a grinding machine in which a grinding wheel is used to grind off the worn edge from the squeegee blade to create a sharp new wear edge. There are, however, a number of disadvantages to the grinding process. The process is time consuming and difficult to control because the rotation of the grinding wheel is usually very high. If the grinding wheel is moved too slowly in relation to the material, the edge of the synthetic squeegee blade undergoing sharpening may melt from the frictional heat caused by grinding wheel. If, on the other hand, the grinding wheel is moved too quickly, it is impossible to grind off the worn out edge of the squeegee blade on a once through basis; and if the grinding wheel is not moved uniformly, the sharpened edge of the squeegee blade becomes uneven which also results in a defective product.

Illustrative of grinding machines of this type are those from Ernst W. Dorn Company, Inc., Printck Equipment Co., Thieme, American CCS Microsharp and Curtis Markus, Inc.

Attempts have been made in the prior art to overcome the deficiencies associated with the use of a grinding wheel by using a knife or cutting blade to trim a squeegee. In U.S. Pat. No. 4,334,448, in particular, a heated blade is used to cut through and provide a new wear edge to a squeegee blade. The use of a heated blade causes problems of its own, however. Specifically, the use of a heated blade raises both safety and maintenance concerns. With respect to the former, the heated cutting tool raises problems with respect to possible burns if contact with the heated cutting tool occurs. In addition, the heated blade produces fumes during the cutting process, which requires ventilation. Maintenance problems include the fact that cooling must occur before cutting tools can be changed. In addition, the requirement of heat necessarily brings electrical elements into the device which present inherent maintenance and service concerns. Finally, because of the need for a heated cutting tool, the device also requires access to a power source which creates limitations in its use. Further problems exist with the heated cutting tool because the heated blade causes deformation and melting of the squeegee blade. As a result, an uneven wear edge can form on the squeegee blade.

Other prior art has attempted to use a non-heated cutting tool to obtain a flat wear edge for the squeegee blade. However, such prior art devices have been cumbersome and inefficient. In particular, certain prior art devices have required removal of the squeegee blade from the squeegee handle before sharpening can occur. Other prior art devices lack a high degree of precision in measuring the thickness of material to be trimmed from the squeegee blade. Prior art apparatuses attempting to provide a high degree of precision for such measurement have been cumbersome to operate due to the size of such apparatuses and the number of moving parts.

Accordingly, it is an object of the present invention to provide a sharpening device which is, capable of not only sharpening the wear edge of a rubber, plastic or polyurethane blade such as a synthetic squeegee blade in a high efficient and easy to control manner but capable of maintaining the flatness of the wear edge of the blade as well.

SUMMARY OF THE INVENTION

In accordance with the present invention, a device is provided to cut off the worn out wear edge of a rubber, plastic or polyurethane blade such as a synthetic squeegee blade and simultaneously provide a new blade edge. The sharpening device of the present invention comprises a housing with a lower base and upper surface. The upper surface has a longitudinal clamp for clamping the blade. The sharpening device further comprises a cutting blade or knife and a moveable carriage for holding said cutting blade; each of which are located within the housing. The carriage preferably holds a removable cutting blade holder. The cutting blade is of ambient temperature, i.e. non-heated, and is preferably a replaceable standard utility blade. The cutting blade is used to cut off the worn edge of the squeegee blade and simultaneously create a new wear edge. The cutting blade is preferably angled so that the upper beveled surface of the blade is substantially parallel to the wear edge of the squeegee blade.

The moveable carriage advances mechanically along the length of and simultaneously cuts the squeegee blade preferably through manual use of a crank engaged with a chain and sprocket system which, in turn, engages the moveable cart. The moveable cart is guided along the length of the blade by two parallel guide rails.

In operation, a squeegee is placed in the device handle side up on precision depth shims which serve to align the wear edge of the squeegee blade with the cutting blade and clamp it into place. The crank is then turned to engage the moveable carriage holding the knife and cause the carriage and knife to run along and cut a new wear edge on the squeegee blade.

Other objects, features and advantages of the present invention will become apparent from a perusal of a presently preferred embodiment taken in connection with the accompanying drawings.

BRIEF DESCRIPTION OF THE DRAWINGS

FIG. 2 is a top elevation of the sharpening device shown in FIG. 1.

FIG. 3 is a side elevation of the sharpening device shown in FIG. 1.

DESCRIPTION OF THE PREFERRED EMBODIMENT

Figure 1:
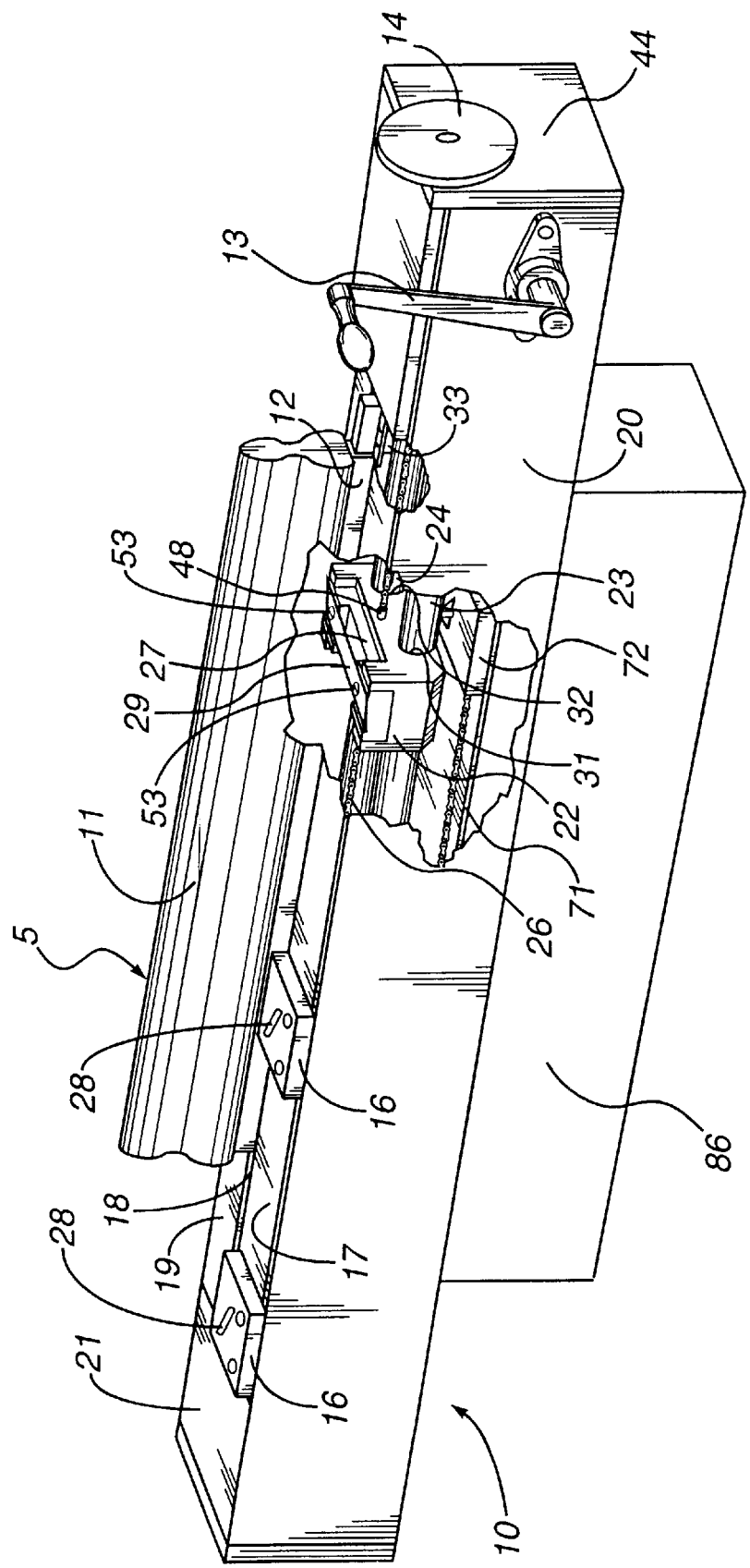
FIG. 1 is an isometric side view of a sharpening device in accordance with the present invention.
Figure 4:
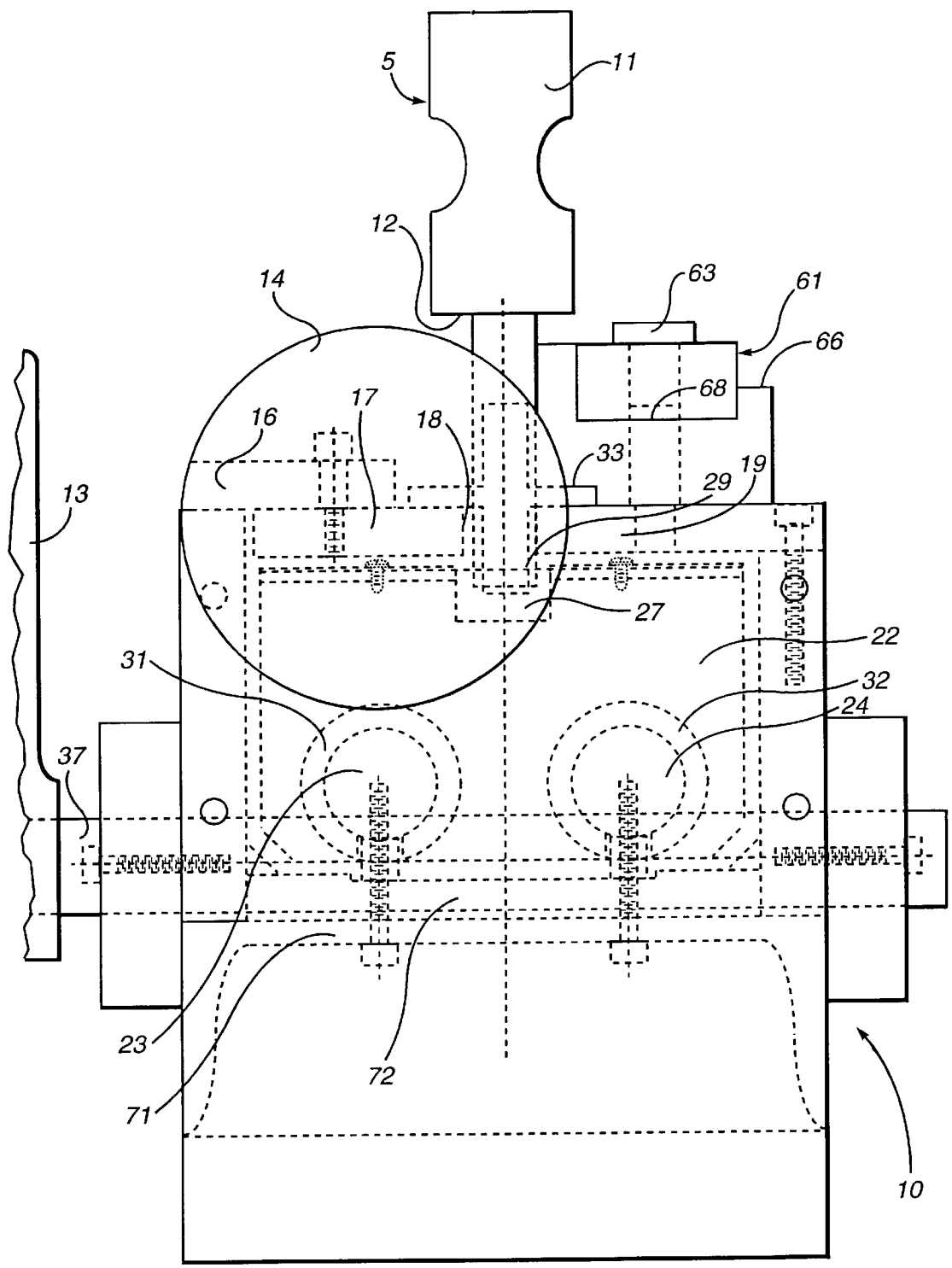
FIG. 4 is a front elevation of the sharpening device shown in FIG. 1.
Figure 6:
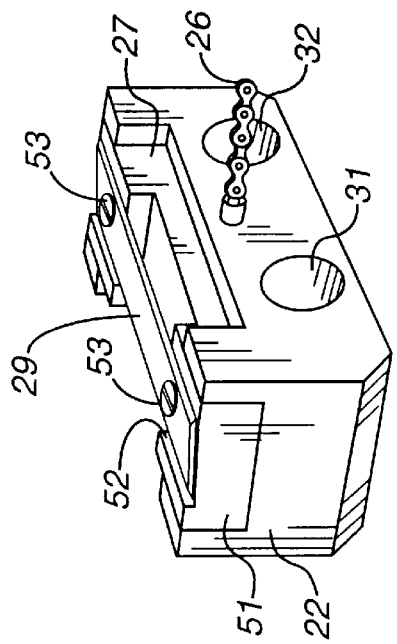
FIG. 6 is an isometric side view of the cutter carriage.

FIGS. 1 and 4 show a preferred embodiment of the sharpening device as used in connection with a squeegee 5. The sharpening device is generally indicated by reference to numeral 10, comprising housing 20 with base 71 and an upper surface including clamping bar 17, backing bar 19 and hinged cover plate 21, crank 13, knob 14, clamping bar 17, backing bar 19 and cutting carriage 22.

Squeegee 5 for use in printing is shown in FIGS. 1 and 4 together with squeegee blade 12. Squeegee 5 is typically used in large silk screening printing machines and may be of substantial length, for example, up to 12 meters. The length of the squeegee depends upon the size of the printing machine. To cut a new edge on squeegee blade 12, squeegee 5 is placed in slot 18 of sharpening device 10, with handle 11 upright and above squeegee blade 12, and squeegee blade 12 resting against stopping block 33. Slot 18 is of sufficient length that squeegees of different lengths can be inserted into sharpening device 10. Stopping block 33 extends downward into slot 18.

Referring to FIG. 2, clamping bar 17 is slidably engaged to brackets 16, through diagonal slots 28, such that adjustment of knob 14, which is preferably knurled, causes clamping bar 17 to move inward toward and securely clamp squeegee blade 12.

Referring to FIG. 3, knob 14 engages clamping bar 17 by means of threaded shaft 34. The threads of shaft 34 interact with a threaded hole in end 44 of sharpening device 10. Knob 46 at the opposite end of shaft 34 rests within holding means 47 attached to the end of clamping bar 17. Holding means 47 does not inhibit the rotation of shaft 34 and acts to hold clamping bar to shaft 34 in such a manner that clamping bar is caused to move along diagonal slots 28 as knob 14 is adjusted and shaft 34, in turn, moves inward or outward.

Referring to FIGS. 1 and 3, cutting carriage 22 moves along and is guided by cylinders 23 and 24, which pass through cylindrical apertures 31 and 32 respectively within cutting carriage 22. Cutting carriage 22 is preferably constructed entirely of or housed in a self-lubricating plastic such as molybdenum impregnated delrin which facilitates the travel of cutting carriage 22 along cylinders 23 and 24. Cylinders 23 and 24 are attached to base 71 by brackets 72 and run parallel to each other along the length of housing 20. Channel 27 (not shown in FIG. 3) at the top of cutting carriage 22 receives squeegee blade 12. Cylinders 23 and 24 can be made of metal or plastic. Knife 29 is positioned across channel 27 with its cutting edge facing end 44. Knife 29 is preferably a replaceable, standard utility knife which can be purchased at hardware stores.

Referring to FIGS. 2 and 3, crank 13 is engaged to a chain and sprocket system within housing 20 which is connected to cutting carriage 22 by chain 26. Sprocket 36 is centered near end 44 of housing 20 and is attached to crank 13 by shaft 37. Sprocket 39 is centered at the opposite end 52 of housing 20 and attaches to housing 20 by shaft 41. Chain 26, which is preferably made of metal, runs the length of sharpening device 10, around both sprocket 39 and sprocket 36. Sprocket 39 and sprocket 36 rest in openings 42 and 43 in base 71 respectively. Springs 73 are located around cylinders 23 and 24 adjacent to crank 13.

Figure 5:
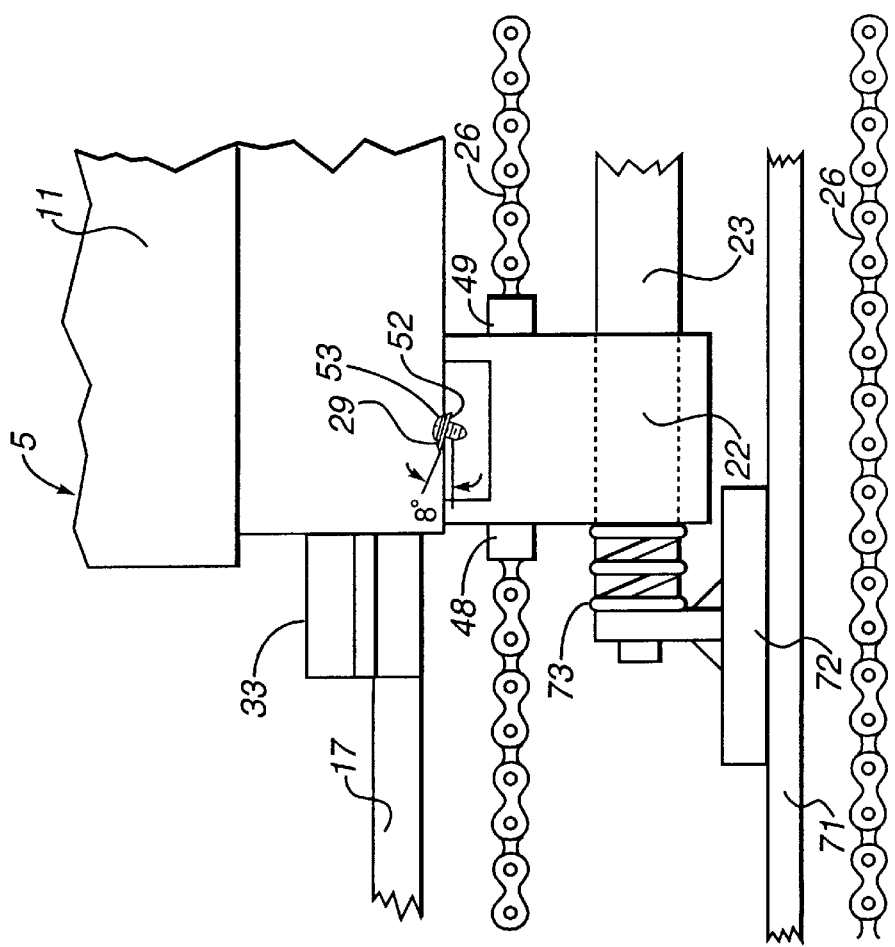
FIG. 5 is a side elevation of the cutter carriage.

Referring specifically to FIGS. 1, 3 and 5, cutting carriage 22 attaches to cable 26 by means of clevis 48 and clevis 49 which screw into cutting carriage 22. In operation, turning crank 13 causes cutting carriage 22 to move along the length of cylinders 23 and 24. Turning crank 13 in the opposite direction causes cutting carriage 22 to return along the length of cylinders 23 and 24 in the opposite direction.

Cutting carriage 22 preferably includes a removable knife holder 51 which rests in and is secured to cutting carriage 22. Knife 29 rests within recess 52 of cutter 51. Knife holder 51 can be accessed and removed through hinged cover plate 21.

Figure 7:
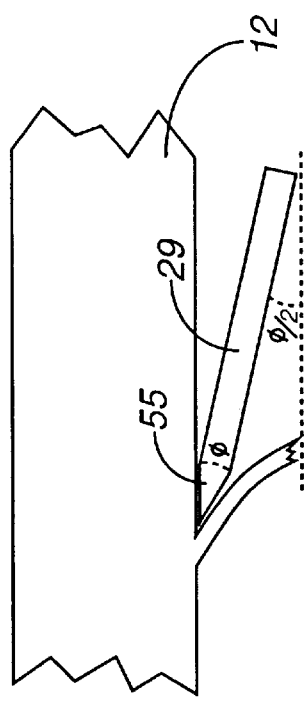
FIG. 7 is a side elevation of the cutting knife.

Referring specifically to FIG. 7, recess 52 is angled so that the upper beveled surface 55 of knife 29 is substantially parallel to the plane of the wear edge of squeegee blade 12. Knife 29 is held in place in the cutter holder by screw 53. As a result, knife 29 can be easily removed and replaced. Standard utility knives, which are preferably used as knife 29, typically have two beveled surfaces meeting to form a cutting edge, as shown in FIG. 7, which form angle $\phi$. Knife 29 is preferably inclined an angle equal to $\phi/2$ to situate the upward beveled surface 55 of knife 29 substantially parallel to the wear edge of squeegee blade 12. With standard utility blades, an angle of 8° is preferred as an angle of inclination equal to $\phi/2$. However, angles between 6° and 10° are satisfactory. Alternate knife holders 51, each with a recess 52 housing a different angle of inclination, can be used as necessary to provide the preferred alignment between upward beveled surface 55 and the wear edge of squeegee blade 12. Cutter holder 51 can also be designed to receive specially designed knives with a curved or angled, i.e., diagonal cutting edge. Smaller or larger angles of inclination may be acceptable with the use of different types of cutting knives in order to position the upward inclined cutting plane of a knife in a substantially parallel position with reference to the wear edge of squeegee blade 12.

The importance of such positioning of the upward inclined cutting blade of the knife has been learned through testing associated with efforts to develop device using an ambient or non-heated blade. As discussed above, heated blades or cutting tools have been found to present both safety and maintenance concerns. In addition, heated cutting tools, as in Messerschmidt, typically melt and deform the squeegee surface being cut with irregular edging being formed around the new wear edge of the squeegee blade. In attempting to develop a device using an ambient or non-heated blade, experimentation has revealed that the best resulting performance, i.e., the best resulting wear edge of the squeegee blade, occurs when the upper beveled surface of the blade or cutting tool is aligned substantially parallel to the plane of the wear edge of the squeegee blade.

In the earliest trials, a single-plane blade was specifically manufactured. Testing of the single-plane blade focused primarily on the use of a blade with the angle of the inclined cutting plane at a minimum of 6° which due to manufacturing constraints and costs was a minimum available angle. Testing revealed that the best wear edge for the squeegee blade was obtained by inclining the single-plane blade 6° so that the upper beveled surface of the blade was parallel to the wear edge of the squeegee blade. Testing of the single-plane blade further revealed that angling the blade at greater than 6°, up to a maximum 10°, also resulted in acceptable results. At greater than 10°, the blade begins to catch and scrape the squeegee blade causing an uneven surface cut.

Reducing the angle of the blade below 6° causes an uneven or wavy surface to result in the wear edge of the squeegee due to compression of the squeegee blade as it contacts the inclined cutting plane of the knife. Such unevenness becomes even more apparent and an item of concern when the blade is heated because the heat causes the squeegee blade to melt, in part, with the compressive forces between the inclined cutting plane of the knife and the squeegee blade forcing melted portions of the squeegee blade outward along the sides of the wear edge of the squeegee blade.

Indeed, Messerschmidt attempted to address such melting problems by employing a single-plane blade with the cutting plane located opposite from the squeegee blade. The cutting blade in Messerschmidt is ideally angled at 2° (toward the squeegee blade) during the cutting operation. With such configuration, a minimum surface area of the heated blade in Messerschmidt is in contact with the squeegee blade during the cutting operation and, consequently, the melting and deformation caused by the heated blade is minimized. Thus, the configuration of the present invention is not compatible with the heated blade because the present invention ideally presents a large surface area (the inclined cutting plane of the knife) to the squeegee blade during cutting.

In subsequent trials, standard utility blades where substituted for the specially manufactured single-plane blade because of the ready access to such blades in the market place. Such standard utility blades have two inclined cutting planes, as depicted in FIG. 7. Testing again showed that the best results were obtained when the upper beveled surface was adjusted to lie substantially parallel to the plane of the wear edge of the squeegee blade. Through experimentation with standard utility blades, it was determined that a substantially parallel relationship between the upper cutting plane of the knife and the plane of the wear edge of the squeegee blade is obtained by inclining the knife at an angle which was exactly half of the angle formed by the two beveled surface of the knife. These angles are shown respectively in FIG. 7 as $\phi/2$ and $\phi$. Trials have further revealed that, with standard utility blades, angle of inclination $\phi/2$ is preferably between 6° and 10°.

Test results using a standard utility blade at different angles and at both ambient and heated temperatures are summarized as follows:

| Blade Angle | Temperature | Results |
| --- | --- | --- |
| Less than 6° | Ambient | Unsatisfactory - Compressive forces between angled cutting plane of blade and squeegee blade cause uneven surface in cut wear edge of squeegee blade |
| | Heated | Generally unsatisfactory - Because of melting/deformation, minimize surface area of blade must be presented to squeegee blade at a small angle (approximately two degrees as disclosed in Messerschmidt); the small angle minimizes compressive forces between the squeegee blade and as a result, minimizes deformation caused by application of such forces to a |

-continued

| Blade Angle | Temperature | Results |
| --- | --- | --- |
| | | melted/heated area of the squeegee blade. |
| 60°–10° | Ambient | Satisfactory - Even surface produced on wear edge of squeegee blade |
| | Heated | Unsatisfactory - Where beveled surface of blade is adjacent to squeegee blade, melting/deformation is maximized; where inclined cutting plane of blade is positioned away from squeegee blade, compressive force is created between the cutting plane and the squeegee blade causing deformation through melting. |
| Greater than 10° | Ambient | Unsatisfactory - Cutting edge of blade increasingly grips and scrapes squeegee blade with increase in blade angle, yielding uneven surface. |
| | Heated | Unsatisfactory - Compressive forces between cutting plane of blade and squeegee blade cause deformation and scraping/gripping of squeegee blade by the cutting edge of the blade increases with the blade angle, both of which problems are enhanced by the heating/melting. |

Figure 8:
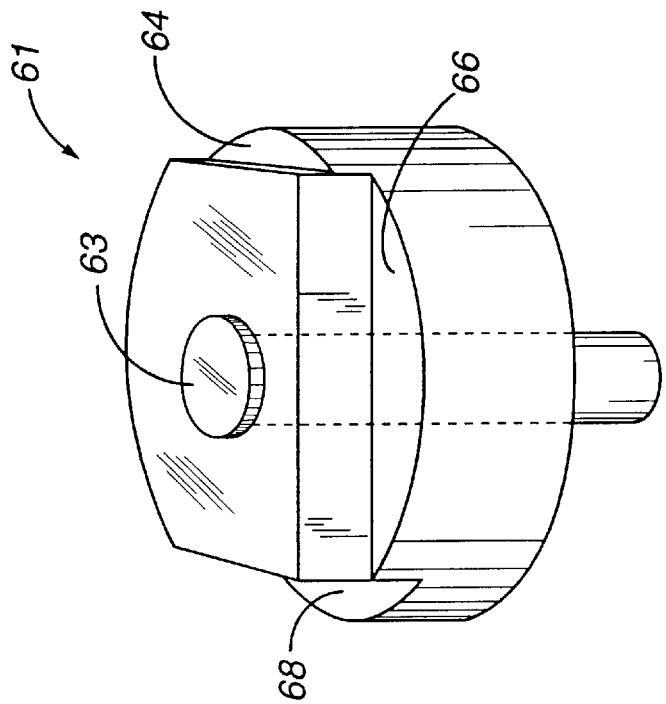
FIG. 8 is an isometric side view of the shimming device.

Referring specifically to FIGS. 2, 4 and 8, at least two shimming devices 61 are located within holes 62 (shown in FIG. 2) along backing bar 19. More than two holes 62 are provided to allow shimming devices 61 to be placed in support positions corresponding to the length of squeegee 11. Shimming device 61, which can be made of metal or plastic, is a disc preferably with three shelf-like recesses 64, 66, and 68 of varying elevation spaced 90° apart at corners of the top of shimming device 61. Shimming device 61 can alternatively have recessed areas of greater or lesser numbers. Shimming device 61 is attached to backing bar 19 by means of holding pin 63 (detailed in FIG. 8) which is inserted through shimming device 61 and into hole 62 to allow shimming device 61 to rotate. The shelf-like recessed areas 64, 66 and 68 (depicted in FIGS. 4 and 8) respectively provide flat support areas of different elevations. In operation, at least two shimming devices are inserted into backing bar 19 and rotated to the same position such that recessed areas of similar elevation on the corners of shimming devices 61 face inward toward slot 18. When squeegee 5 is inserted in slot 18, the underside of the squeegee handle 11 rests against and is supported by the recessed areas of shimming devices 61. When further cutting of the squeegee blade is desired, the shimming devices can be rotated to present lower recessed areas to receive the squeegee and thereby allow for lowering of squeegee blade 12 to a position where it will again be engaged by knife 29.

Figure 10:
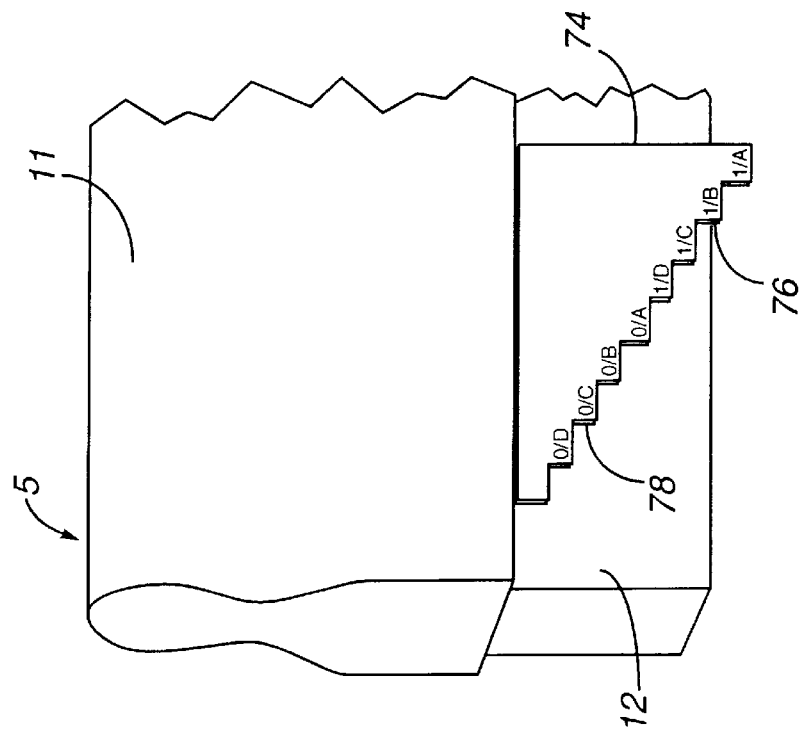
FIG. 10 is an isometric view of the stopping block.

Referring to FIG. 10, shimming devices 61 are preferably used in connection with cut gauge 74. In operation, cut gauge 74 is placed against the underside of squeegee handle 11 and against the side of squeegee blade 12. Lines or areas of demarcation, such as demarcation area 76, exist along one side of cut gauge 74. Cut gauge 74, as depicted in FIG. 10, has eight such areas or lines of demarcation. In use, the areas or lines of demarcation assist the user in selecting the appropriate recessed area on shimming devices 61 to allow the minimum amount of squeegee blade 12 to be trimmed while obtaining a new wear edge. By way of example, when cut gauge 74 is aligned against the underside of squeegee handle 11 in FIG. 8, the wear edge of squeegee blade 12 lies in area of demarcation 76, which bares a designation "1/B." The same designation would appear on the recessed area of shimming devices 61 having the second highest elevation.

Cut gauge 74 has eight areas of demarcation and, as a result, is designed to work in connection with two stacked shimming devices 61. More specifically, area of demarcation 76 corresponds to a trimming position which is obtained by stacking one shimming device 61 on top of another.

By way of further example, if the wear edge of squeegee blade 12 fell within area of demarcation 78 which is designated by "0/C", a single shimming device 61 would be used to position squeegee blade 12 at an appropriate trimming position with the third highest recessed areas on shimming device 61 being presented for contact with the underside of squeegee handle 11.

Cut gauges having additional areas of demarcation such that more than two shimming devices 61 can be stacked to obtain an appropriate cutting trimming position can also be used.

Figure 9:
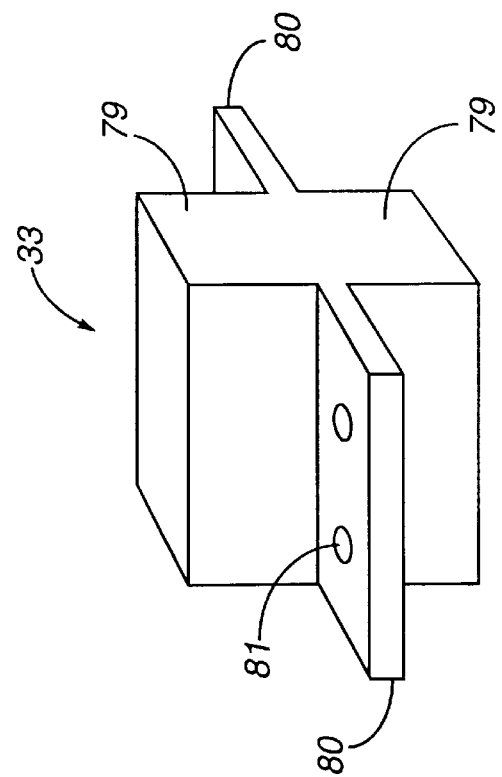
FIG. 9 is a side elevation of the cut gauge in operation.

Referring to FIG. 9, stopping block 33 is shown in a preferred embodiment with upper and lower blocking bars 79. Support areas 80 extend perpendicularly outward from the midpoint of upper and lower blocking bars 79. In operation, lower blocking bar 79 of stopping block 33 extends downward into slot 18. Support areas 80 rest on the top of clamping bar 17 and backing bar 19. At least one hole 81 can be made in support areas 80 to allow stopping block 33 to be secured to backing plate 19 through use of a pin or screw. Stopping block 33 is inserted downward into slot 18 near the end of slot 18 adjacent to end 44. Blocking bars 79 are of sufficient height to extend beyond the height of squeegee blade 12 in any trimming position. Stopping block 33 is preferably constructed of a material of which is capable of being cut by knife 29 without dulling the cutting edge of knife 29. Preferably such material is rubber, plastic or polyurethane with a higher durometer and rigidity than that of the squeegee blade 12.

In operation, squeegee blade 12 is inserted into slot 18 and placed securely against stopping block 33 before being secured through operation of clamping bar 17. During the trimming operation, as cutting carriage 22 and knife 29 reach the end of squeegee blade 12 adjacent to end 44, stopping block 33 acts to prevent the end of squeegee blade 12 from deforming and, as a result, maintains an even, trimmed wear edge in squeegee blade 12. To facilitate this result, stopping block 33 is positioned so that as knife 29 completes its plane of travel, in trimming squeegee blade 12, the knife passes beyond the end of squeegee blade 12 and imbeds slightly into stopping block 33. Consequently, because of its composition, stopping block 33 absorbs a cut from knife 29 and, therefore, provides the novel result of avoiding a dulling effect on knife 29. Stopping block 33 can be rotated and inverted to present four different edges of blocking bars 79 as successive edges of blocking bars 79 become worn.

Referring to FIG. 1, a wall mount 86 can be provided with sharpening device 10 to allow for it to be securely attached to an appropriate location in a printing shop.

OPERATION

To operate sharpening device 10, crank 13 is manually operated in a counter-clockwise direction to advance cutting carriage 22 to the end of cylinders 23 and 24 adjacent to sprocket 39. Shimming devices 61 are thereafter located in holes 62 to provide uniform support to squeegee 11 and rotated to present uniform recessed areas which will allow a desired minimum thickness of squeegee blade 12 to extend below the cutting plane of knife 29. Preferably, the appropriate recessed areas in shimming devices 61 necessary to present a minimum desired thickness for trimming are determined through use of cut gauge 74. As additional trimming of squeegee blade 12 becomes necessary, shimming devices 61 are rotated from this first trimming position to a second and thereafter to other successive positions. Preferably, shimming devices 61 can be stacked to increase the total number of trimming positions. Squeegee 11 is then inserted into slot 18 with the front of squeegee blade 12 placed directly against stopping block 33 and the underside of the squeegee handle resting on shimming devices 61. Next, crank 13 is manually turned in the a clockwise direction to advance cutting carriage 22 towards end 44 of housing 20 and cause knife 29 to engage, cut and provide a sharpened edge to squeegee blade 12. Cutting carriage 22 travels the length of squeegee blade 12 with knife 29 passing beyond the edge of squeegee blade 12 and into stopping block 33. Thereafter crank 13 is disengaged, and springs 73 act to push cutting carriage 22 backwards, slightly disengaging knife 29 from stopping block 33. The old edge of squeegee blade 12 drops to base 71 as it is cut and can be retrieved through holes 42 and 43 in base 71. Additional openings along the length of base 71 can be added for this purpose. Knob 14 is thereafter turned to disengage clamping bar 17 and allow squeegee 11 to be removed from sharpening device 10.

With the sharpening device of the present invention, it is possible to sharpen the wear edge of a squeegee blade used in silk screening printing very quickly and without special skill to control the fineness and flatness of the sharpened edge.

While presently preferred embodiments of the invention have been shown and described with particularity, the invention may be otherwise embodied within the scope of the appended claims. In particular, the sharpening device of the present invention can have application to other rubber, plastic or polyurethane blades.

What is claimed is:

1. A sharpening device for sharpening a rubber, plastic or polyurethane squeegee blade attached to a squeegee handle and having at least one wear edge, comprising:

a. a housing with a lower base and a top surface area, said top surface area having a longitudinal slot;

b. a longitudinal clamp attached to said top surface area of said housing for clamping the squeegee blade in an upright position in the longitudinal slot of said top surface area;

c. a track assembly located within said housing and mounted on said lower base;

d. a carriage mounted on and moveable along said track assembly;

e. a cutting blade with at least one beveled surface forming a cutting edge, said cutting blade being removably mounted on said carriage for cutting the wear edge of the squeegee blade and simultaneously creating a new wear edge, said cutting blade mounted with an upwardly inclined cutting angle, with respect to the horizontal length of the wear edge, such that said at least one beveled surface is substantially parallel to the longitudinal plane of the wear edge of the squeegee blade;

f. drive means attached to said housing and said carriage for advancing said carriage parallel to the wear edge of the squeegee blade, whereby said cutting blade is capable of contacting and cutting said wear edge; and g. means mounted on said top surface area of said housing for variably positioning and aligning the vertical position of the wear edge of the squeegee blade in relation to said cutting blade, said variable positioning and aligning means operable to engage the underside of the squeegee handle.

2. A sharpening device as set forth in claim 1, wherein said drive means comprises a chain and sprocket assembly and a manual crank.

3. A sharpening device as set forth in claim 1, wherein said drive means comprises a cable and pulley assembly and a manual crank.

4. A sharpening device as set forth in claim 1 wherein said track assembly comprises two parallel cylinders.

5. A sharpening device as set forth in claim 1 wherein said longitudinal clamp comprises a moveable clamping bar and a stationary backing bar.

6. A sharpening device as set forth in claim 1, wherein said positioning and aligning means comprises at least two discs, each said disc having at least two recessed support corners with different elevations which are positioned to engage and provide support to the underside of the squeegee handle, and each said disc being rotatable so that different recessed support corners can be selected for engagement with the squeegee handle.

7. A sharpening device as set forth in claim 6, wherein said discs can be stacked to provide additional positioning elevations.

8. A sharpening device as set forth in claim 1, wherein said cutting blade is inclined upwardly at an angle between 6 and 10 degrees.

9. A sharpening device as set forth in claim 1, wherein said cutting blade has an ambient temperature.

10. A sharpening device as set forth in claim 1, wherein said carriage includes a removable cutting blade holder to which said cutting blade is removably mounted.

11. A sharpening device as set forth in claim 1, wherein said carriage is self-lubricating.

12. A sharpening device as set forth in claim 1, wherein said carriage is comprised of molybdenum impregnated delrin.

13. A sharpening device as set forth in claim 1, wherein said sharpening device further comprises a removable stopping block mounted in the longitudinal slot of said upper surface area of said housing, said stopping block mounted in a position whereby it is operable to contact and provide longitudinal support to an end of the squeegee blade during the cutting of the squeegee blade, and said stopping block having a composition capable of engaging and absorbing said cutting blade without dulling said cutting blade.

14. A sharpening device as set forth in claim 13, wherein said stopping block is comprised of one of the group of materials consisting of rubber, plastic and polyurethane with a higher rigidity and durometer than that of the squeegee blade.

15. A sharpening device as set forth in claim 13, wherein said stopping block is comprised of upper and lower blocking bars, each with two blocking ends, and support planes which extend perpendicularly from the vertical midpoint of said upper and lower blocking bars, said stopping block capable of being rotated and inverted to present each said blocking end of each said blocking bar for engagement with said cutting blade.

16. A sharpening device as set forth in claim 1, wherein said sharpening device further comprises springs mounted on said track assembly for slowing the movement of said carriage along said track assembly at the end of the cutting of the squeegee blade.

17. A sharpening device as set forth in claim 1, wherein said sharpening device further comprises a mounting assembly attached to said housing for securely attaching said sharpening device to a wall or table.

18. A sharpening system for sharpening a rubber, plastic or polyurethane squeegee blade attached to a squeegee handle and having at least one wear edge, said system consisting of:

a. a sharpening device comprising:

(i) a housing with a lower base and a top surface area, said top surface area having a longitudinal slot;

(ii) a longitudinal clamp attached to said top surface area of said housing for clamping the squeegee blade in an upright position in the longitudinal slot of said top surface area;

(iii) a track assembly located within said housing and mounted on said lower base;

(iv) a carriage mounted on and moveable along said track assembly;

(v) a cutting blade with at least one beveled surface forming a cutting edge, said cutting blade being removably mounted on said carriage for cutting the wear edge of the squeegee blade and simultaneously creating a new wear edge, said cutting blade mounted with an upwardly inclined cutting angle, with respect to the horizonal length of the wear edge, such that said at least one inclined cutting plane is substantially parallel to the longitudinal plane of the wear edge of the squeegee blade;

(vi) drive means attached to said housing and said carriage for advancing said carriage parallel to the wear edge of the squeegee blade, whereby said cutting blade is capable of contacting and cutting said wear edge; and (vii) means mounted on said top surface of said housing for variably positioning and aligning the vertical position of the wear edge of the squeegee blade in relation to said cutting blade, said variable positioning and aligning means operable to engage the underside of the squeegee handle; and b. a cut gauge which is removably placed against the underside of the squeegee handle and against the side of the squeegee and, through areas of demarcation on said cut gauge, measures the vertical height of the squeegee blade and assists in identifying a position for said variable positioning and aligning means which, when engaged with underside of the squeegee handle, presents a minimum wear edge for trimming.

\* \* \* \* \*